(12) United States Patent
Shanley et al.

(10) Patent No.: US 7,430,201 B1
(45) Date of Patent: Sep. 30, 2008

(54) METHODS AND APPARATUS FOR ACCESSING FULL BANDWIDTH IN AN ASYNCHRONOUS DATA TRANSFER AND SOURCE TRAFFIC CONTROL SYSTEM

(75) Inventors: Timothy M. Shanley, Orange, CT (US);
Ronald P. Novick, Orange, CT (US);
Sing Ngee Yeo, Stratford, CT (US)

(73) Assignee: TranSwitch Corporation, Shelton, CT (US)

( * ) Notice: Subject to any disclaimer, the term of this patent is extended or adjusted under 35 U.S.C. 154(b) by 976 days.

(21) Appl. No.: 10/393,800

(22) Filed: Mar. 21, 2003

(51) Int. Cl.
*H04L 12/50* (2006.01)
(52) U.S. Cl. .................................... 370/362; 710/117
(58) Field of Classification Search ............... None
See application file for complete search history.

(56) References Cited

U.S. PATENT DOCUMENTS

| | | | |
|---|---|---|---|
| 3,982,077 A | 9/1976 | Clark et al. ............. 179/15 BV |
| 3,985,962 A | 10/1976 | Jones et al. ............. 179/15 AL |
| 4,149,144 A | 4/1979 | Diefenderfer ........... 340/147 R |
| 4,156,798 A | 5/1979 | Doelz .................... 179/15 AL |
| 4,375,681 A | 3/1983 | Abbott et al. ................. 370/16 |
| 4,412,324 A * | 10/1983 | Glowinsky et al. ........... 370/358 |
| 4,460,993 A | 7/1984 | Hampton et al. ............... 370/84 |
| 4,488,293 A | 12/1984 | Haussmann et al. ........... 370/84 |
| 4,660,169 A | 4/1987 | Norgren et al. ............. 364/900 |
| 4,685,101 A | 8/1987 | Segal et al. .................... 370/84 |
| 4,710,921 A * | 12/1987 | Ishidoh et al. ............... 370/522 |
| 4,727,536 A | 2/1988 | Reeves et al. ................. 370/84 |
| 4,750,168 A | 6/1988 | Trevitt ......................... 370/85 |
| 4,763,320 A | 8/1988 | Rudolph et al. ............... 370/85 |
| 4,789,926 A | 12/1988 | Clarke ........................ 364/200 |
| 4,815,074 A | 3/1989 | Jacobsen ..................... 370/112 |
| 4,817,037 A | 3/1989 | Hoffman et al. ............. 364/200 |
| 5,048,012 A | 9/1991 | Gulick et al. ................ 370/472 |
| 5,084,872 A | 1/1992 | Le Cucq et al. ............. 370/94.2 |
| 5,163,048 A | 11/1992 | Heutink ..................... 370/85.6 |
| 5,172,373 A | 12/1992 | Suzuki ..................... 370/85.11 |
| 5,191,418 A * | 3/1993 | Tran ........................... 348/474 |
| 5,263,023 A | 11/1993 | Sevenhans et al. ........ 370/85.11 |
| 5,276,678 A | 1/1994 | Hendrickson et al. ......... 370/62 |
| 5,299,193 A | 3/1994 | Szczepanek ............... 370/85.1 |
| 5,452,330 A | 9/1995 | Goldstein .................... 375/257 |
| 5,572,686 A | 11/1996 | Nunziata et al. ............. 395/296 |
| 5,838,681 A * | 11/1998 | Bonomi et al. ......... 370/395.41 |
| 5,901,146 A | 5/1999 | Upp ........................... 370/389 |

OTHER PUBLICATIONS

Mitel Corporation 1988 Catalog Table of Contents and pp. 5-151, 4-171, 5-261 through 5-267.
Intel Corporation 1989 Microprocessor and Peripheral Handbook cover page and pp. 2-222 through 2-240.
PCI Local Bus Specification Revision 2.0, Apr. 30, 1993.

* cited by examiner

*Primary Examiner*—Huy D Vu
*Assistant Examiner*—Rhonda Murphy
(74) *Attorney, Agent, or Firm*—Gordon & Jacobson, PC

(57) ABSTRACT

Methods for accessing full bandwidth in an asynchronous data transfer and source traffic control system include permitting some bus users (e.g. networks cards) to access both odd and even frames while permitting other bus users (e.g. subscriber line cards) to access only odd or even frames. An apparatus according to the invention supports line cards numbering up to 32−(2×the number of network cards). An exemplary embodiment shows a single network card coupled to an OC-12 network link and twenty asymmetric digital subscriber line cards.

21 Claims, 2 Drawing Sheets

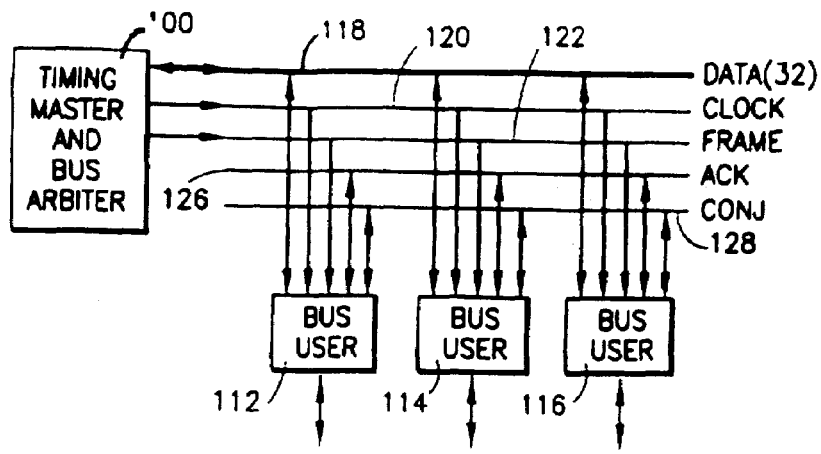

Fig. 2 – Prior Art

| CLOCK CYCLE | ←-------- 32 BITS --------→ | | | |
|---|---|---|---|---|
| 0 | REQUEST FIELD | | | |
| 1 | INTERNAL ROUTING FIELD (OPTIONAL) | | | |
| 2 | A B C D   VPI | VCI | | P T I   C L P |
| 3 | BYTE 3 | BYTE 2 | BYTE 1 | BYTE 0 |
| 4 | BYTE 7 | BYTE 6 | BYTE 5 | BYTE 4 |
| 5 | BYTE 11 | BYTE 10 | BYTE 9 | BYTE 8 |
| 6 | BYTE 15 | BYTE 14 | BYTE 13 | BYTE 12 |
| 7 | BYTE 19 | BYTE 18 | BYTE 17 | BYTE 16 |
| 8 | BYTE 23 | BYTE 22 | BYTE 21 | BYTE 20 |
| 9 | BYTE 27 | BYTE 26 | BYTE 25 | BYTE 24 |
| 10 | BYTE 31 | BYTE 30 | BYTE 29 | BYTE 28 |
| 11 | BYTE 35 | BYTE 34 | BYTE 33 | BYTE 32 |
| 12 | BYTE 39 | BYTE 38 | BYTE 37 | BYTE 36 |
| 13 | BYTE 43 | BYTE 42 | BYTE 41 | BYTE 40 |
| 14 | BYTE 47 | BYTE 46 | BYTE 45 | BYTE 44 |
| 15 | SYSTEM CONTROL | | | GEN GRANUM T |

Fig. 3 – Prior Art

METHODS AND APPARATUS FOR ACCESSING FULL BANDWIDTH IN AN ASYNCHRONOUS DATA TRANSFER AND SOURCE TRAFFIC CONTROL SYSTEM

This application is related to co-owned U.S. Pat. No. 5,901,146 and No. 6,104,724, the complete disclosures of which are hereby incorporated by reference herein.

BACKGROUND OF THE INVENTION

1. Field of the Invention

This invention relates generally to asynchronous data communication among a bus master and a plurality of bus users. More particularly, this invention relates to methods and apparatus for providing a bus user with the maximum possible bandwidth.

2. State of the Art

Data communication among a bus master and a plurality of bus users is well known in the art. Such communication systems generally include a bidirectional data bus to which the bus master and all of the bus users are connected. The bus master typically produces at least one synchronizing clock signal which is received by all of the bus users on a clock bus separate from the data bus. One data unit which is equal to the bus width can be transferred onto the bus or off the bus during one clock cycle. While all bus users can transfer data off the bus simultaneously, only one bus user can transfer data onto the bus during any given clock cycle. The bus user (which could be the bus master) transferring data onto the bus is said to have "access" or to be "active". In order to determine which bus user is given access during a given clock cycle, an arbitration procedure is established. Typically, each bus user is assigned a time slot in a fixed number of time slots called a data "frame". The frame which defines bus access may be provided with one or more time slots for the exchange of control information in addition to the time slots which are assigned to data transfer. As the clock cycles are received by all of the bus users via the clock bus, each bus user waits for its assigned time slot and then transfers data to the bus during its assigned cycle.

It is recognized that, particularly in asynchronous data transfer systems, bus users are not always ready to transfer data onto the bus during their assigned time slot. Conversely, other bus users may accumulate data for transfer onto the bus faster than their assigned access to the frame will allow them to transfer the data onto the bus. Consequently, it is often desirable to adjust the access mechanism to allow some users relatively more access than others; i.e., more slots in the frame. Many sophisticated algorithms have been developed for arbitrating bus access. However, these known systems typically require that each bus user be aware of the arbitration scheme so that each bus user can tell how much access it has been allocated.

Previously incorporated co-owned U.S. Pat. No. 5,901,146 and No. 6,104,724 disclose an asynchronous data transfer and source traffic control system as shown in prior art FIG. 2. The system includes a bus master 100 and a plurality of bus users, e.g. 112, 114, 116, coupled to a bidirectional data bus 118. The bus master 100 provides two clock signals to each bus user, a system clock 120 and a frame clock 122. The backplane may also include an acknowledge line 126 and a congestion line 128. The frame clock designates the start of a frame. Prior art FIG. 3 illustrates a frame format which preferably includes fifteen or sixteen system clock cycles, the first of which is designated the request field and the last of which includes a grant field. One or more other cycles may be assigned control and/or routing information and the remainder of the cycles comprise a data field of fixed length. During the request field, any number of bus users may request access which is received by the bus master. During the grant field, the bus master grants access to a selected bus user for the entire data portion of the next frame. Which user is granted access to the next frame is determined according to an arbitration algorithm in the bus master which may be unknown to the bus users. The asynchronous data transfer and source traffic control system has particular application in accommodating the transfer of the contents of ATM cells used in BISDN systems. More particularly, this co-owned technology is used in the manufacture of ATM switches and is sold under the brand name CellBus®.

The co-owned CellBus® technology is based on a data bus which is thirty-two bits wide. The protocol supports either sixteen or thirty-two users. When in sixteen user mode, a maximum of sixteen devices may be coupled to the same bus. Each of the sixteen devices can request access to the bus for any frame and thus any device can utilize the full bandwidth of the bus. Access is requested by asserting one or both of two data lines assigned to the user. The two-bit request permits three levels of priority, 01 being a priority 1 request, 10 being a priority 2 request and 11 being a priority 3 request. In thirty-two user mode, a maximum of thirty-two devices can be coupled to the same bus but, in order to maintain prioritization of the requests, each device can only request access to the bus every other frame. For example, devices 1-16 may request access to even frames while devices 17-32 may request access to odd frames. Therefore, in thirty-two user mode, each device can only request a maximum of half the available bandwidth of the bus.

In a typical CellBus® application, one (or sometimes two) of the devices are connected to network links while all other devices are connected to line cards with user links. These applications concentrate traffic from the user links to the network link and distribute traffic from the network link to the user links. It will be appreciated, therefore, that the network links require as much or more bandwidth as all of the line cards combined. In fact, in asymmetric applications (which are common, e.g. xDSL subscriptions) the network links require substantially more than half the bandwidth since most traffic flows from the network to the users. Thus, in many applications, it is undesirable to limit the amount of bandwidth available to some devices but it is still desirable to maintain the maximum possible number of devices coupled to the same bus.

SUMMARY OF THE INVENTION

It is therefore an object of the invention to provide methods and apparatus for accessing full bandwidth in an asynchronous data transfer and source traffic control system.

It is also an object of the invention to provide methods and apparatus for accessing full bandwidth in an asynchronous data transfer and source traffic control system which still maintains the maximum possible number of users.

In accord with these objects which will be discussed in detail below, the methods of the present invention include permitting some bus users (e.g. networks cards) to access both odd and even frames while permitting other bus users (e.g. subscriber line cards) to access only odd or even frames. Thus, an apparatus according to the invention supports line cards numbering up to 32−(2×the number of network cards).

An exemplary embodiment shows a single network card coupled to an OC-12 network link and twenty asymmetric digital subscriber line cards where bandwidth is allocated 75% downstream and 25% upstream.

Additional objects and advantages of the invention will become apparent to those skilled in the art upon reference to the detailed description taken in conjunction with the provided figures.

BRIEF DESCRIPTION OF THE DRAWINGS

FIG. 2 illustrates the prior art CellBus® system;
and
FIG. 3 illustrates the prior art CellBus® frame.

DETAILED DESCRIPTION OF THE PREFERRED EMBODIMENTS

Figure 1:
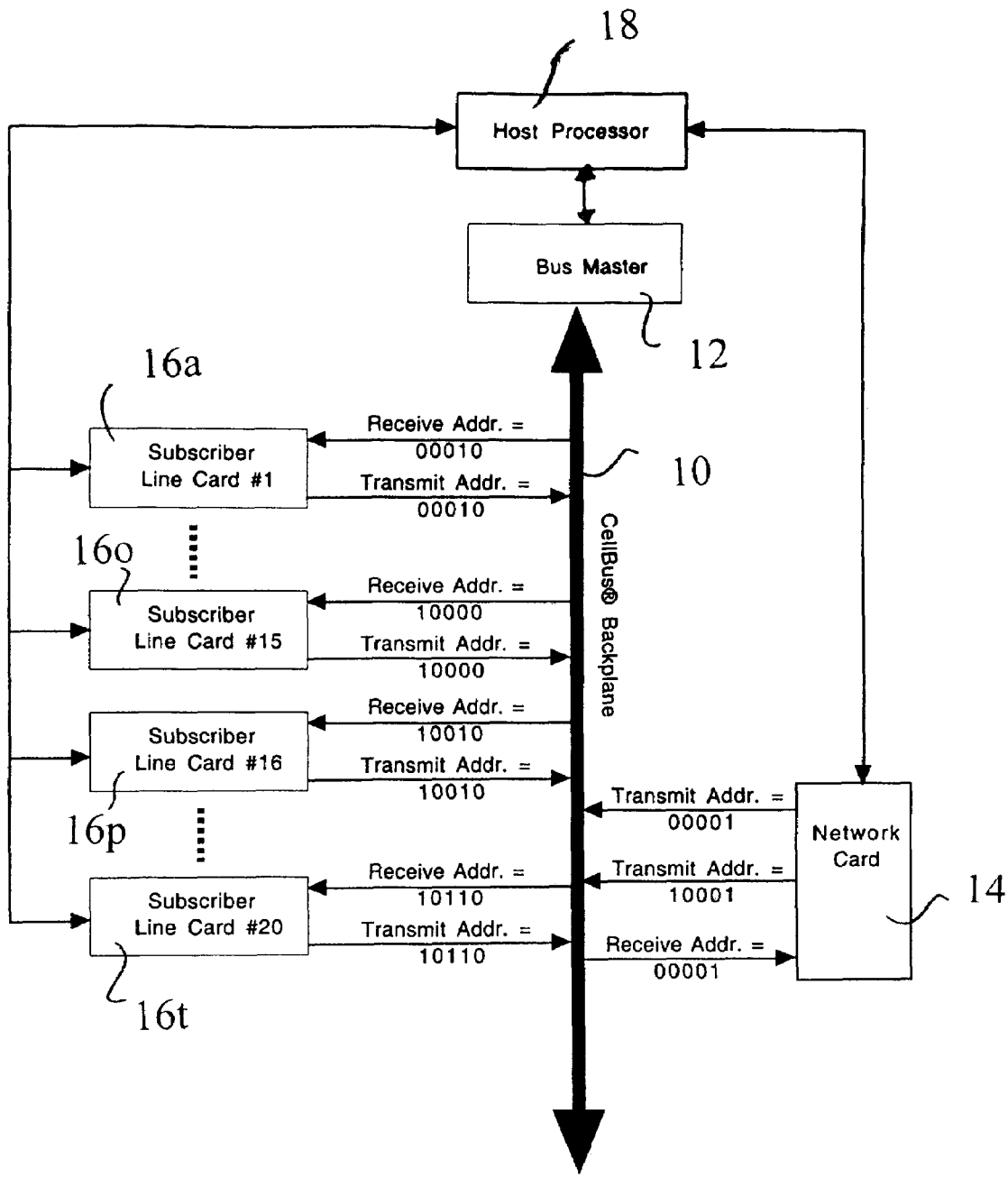
FIG. 1 is a high level schematic diagram illustrating an exemplary implementation of the invention.

Referring now to FIG. 1, an exemplary embodiment of an apparatus incorporating the methods of the invention includes a CellBus® backplane 10 coupled to a bus master 12, a network interface card 14, and twenty subscriber line cards, 16a-16t. A host processor 18 is preferably coupled to all of the bus users 14, 16a-16t, as well as to the bus master 12.

According to the methods of the invention, the host processor 18 configures the network card 14 to have two different transmit addresses and a single receive address. The subscriber line cards 16a-16t are each configured to have a single transmit address and a single receive address, preferably with the transmit address being the same number as the receive address.

Those skilled in the art will appreciate that the network card 14 is preferably coupled to an OC-12 link (not shown) and the line cards 16a-16t are preferably coupled to ADSL lines (not shown).

According to the presently preferred embodiment of the invention, thirty-two transmit addresses and thirty-two receive addresses may be assigned. The addresses number from zero to thirty-one and are expressed in binary numerals as 00000 through 11111. Since each network card is assigned two transmit addresses, the maximum number of subscriber line cards supported by this embodiment is 32−(2×number of network cards). It will also be appreciated that one receive address is abandoned for each network card installed.

According to the current implementation, the additional transmit address of the network card is created by altering the most significant digit of the first transmit address. However, it is only necessary that one transmit address be chosen from addresses 0-15 and the other be chosen from the addresses 16-31. In this way, the network card has the ability to request access to the bus during every frame.

According to the presently preferred implementation, all of the bus users and the bus master are based on the same VLSI chip which is configurable by the host processor to be either a bus user or a bus master and is configurable to have a single transmit address or two transmit addresses. This presently preferred implementation is embodied in the ASPEN EXPRESS™ VLSI chip from TranSwitch Corp., Shelton, Conn.

The ASPEN EXPRESS™ chip supports a bidirectional throughput of 622 Mbps, the equivalent of an OC-12 network link. Thus, the example shown in FIG. 1 makes maximum use of the network card bandwidth. Given a CellBus® system running at 25 MHz in thirty-two user mode, the total usable bandwidth is 650 Mbps. In the hypothetical example of FIG. 1, each of the subscriber line cards are configured to support an ADSL (asymmetrical digital subscriber line) connection having a downstream throughput of approximately 465 Mbps and an upstream throughput of approximately 155 Mbps. Those skilled in the art will appreciate that the full utilization of the CellBus® system bandwidth among more than fifteen subscriber lines would not be possible without the methods of the invention.

There have been described and illustrated herein methods and apparatus for accessing full bandwidth in an asynchronous data transfer and source traffic control system. While particular embodiments of the invention have been described, it is not intended that the invention be limited thereto, as it is intended that the invention be as broad in scope as the art will allow and that the specification be read likewise. Thus, while a particular addressing algorithm has been disclosed, it will be appreciated that other algorithms could be used to provide one or more bus users with dual transmit addresses while providing other bus users with single transmit addresses. Also, while the presently preferred embodiment has been implemented in the TranSwitch ASPEN EXPRESS™ chip, it will be recognized that the invention could be implemented in other devices. In addition, while the exemplary embodiment has been described in conjunction with ADSL cards, it will be understood that other types of digital subscriber lines could be used. It will therefore be appreciated by those skilled in the art that yet other modifications could be made to the provided invention without deviating from its spirit and scope as so claimed.

The invention claimed is:

1. A method of providing full bandwidth to some users and half bandwidth to other users in an asynchronous data transfer and source traffic control system where data is transferred over a bus in a repeating frame, said method comprising:
   a) configuring a plurality of bus users each with a single transmit address and a single receive address, wherein each transmit address has access to either even frames or odd frames, but not both; and
   b) configuring at least one bus user with a single receive address and two transmit addresses, one of said two transmit addresses having access to only even frames and the other of said two transmit addresses having access to only odd frames.

2. The method according to claim 1, wherein:
   said two transmit addresses differ only by a most significant digit when represented as binary numerals.

3. The method according to claim 2, wherein:
   one of said two transmit addresses is between 0 and 15 and the other is between 16 and 31.

4. The method according to claim 1, wherein:
   the system includes a bus master,
   the bus users request access to the bus at the beginning of the frame, and
   the bus master grants access at the end of the frame.

5. The method according to claim 1, wherein:
   the repeating frame contains 48 bytes of data.

6. The method according to claim 1, wherein:
   the bus is thirty-two bits wide.

7. The method according to claim 6, wherein:
   the repeating frame is fifteen clock cycles.

8. The method according to claim 6, wherein:
   the repeating frame is sixteen clock cycles.

9. The method according to claim 1, wherein:
   said steps of configuring are performed by a host processor coupled to the bus users.

10. An apparatus providing full bandwidth to some users and half bandwidth to other users in an asynchronous data transfer and source traffic control system where data is transferred over a bidirectional data bus in a repeating frame, said apparatus comprising:
- a) a plurality of client bus users each having a single transmit address and a single receive address, wherein each transmit address has access to either even frames or odd frames, but not both; and
- b) at least one network bus user having a single receive address and two transmit addresses, one of said two transmit addresses having access to only even frames and the other of said two transmit addresses having access to only odd frames, wherein
  each of said client bus users and network bus users are coupled to said bidirectional data bus.

11. The apparatus according to claim 10, wherein:
said two transmit addresses differ only by most significant digit when represented as binary numerals.

12. The apparatus according to claim 11, wherein:
one of said two transmit addresses is between 0 and 15 and the other is between 16 and 31.

13. The apparatus according to claim 10, further comprising:
- c) a bus master coupled to said bidirectional data bus, wherein
  the bus users request access to the bus at the beginning of the frame, and
  the bus master grants access at the end of the frame.

14. The apparatus according to claim 10, wherein:
the repeating frame contains 48 bytes of data.

15. The apparatus according to claim 10, wherein:
the bus is thirty-two bits wide.

16. The apparatus according to claim 15, wherein:
the repeating frame is fifteen clock cycles.

17. The apparatus according to claim 15, wherein:
the repeating frame is sixteen clock cycles.

18. The apparatus according to claim 10, further comprising:
- c) a host processor coupled to each bus user for assigning transmit and receive addresses to the bus users.

19. A bus user for use in an asynchronous data transfer and source traffic control system where data is transferred over a bidirectional data bus in a repeating frame, said bus user comprising:
- a) coupling means for coupling said bus user to the bidirectional data bus;
- b) addressing means for assigning a single receive address and two transmit addresses to said bus user, one of said two transmit addresses having access to only even frames and the other of said two transmit addresses having access to only odd frames.

20. The bus user according to claim 19, wherein:
said two transmit addresses differ only by most significant digit when represented as binary numerals.

21. The bus user according to claim 20, wherein:
one of said two transmit addresses is between 0 and 15 and the other is between 16 and 31.

* * * * *